Aug. 17, 1943.                M. ROSIN                  2,326,972
                     COMBINED DAY AND NIGHT COACH
                         Filed Nov. 5, 1940          5 Sheets-Sheet 1
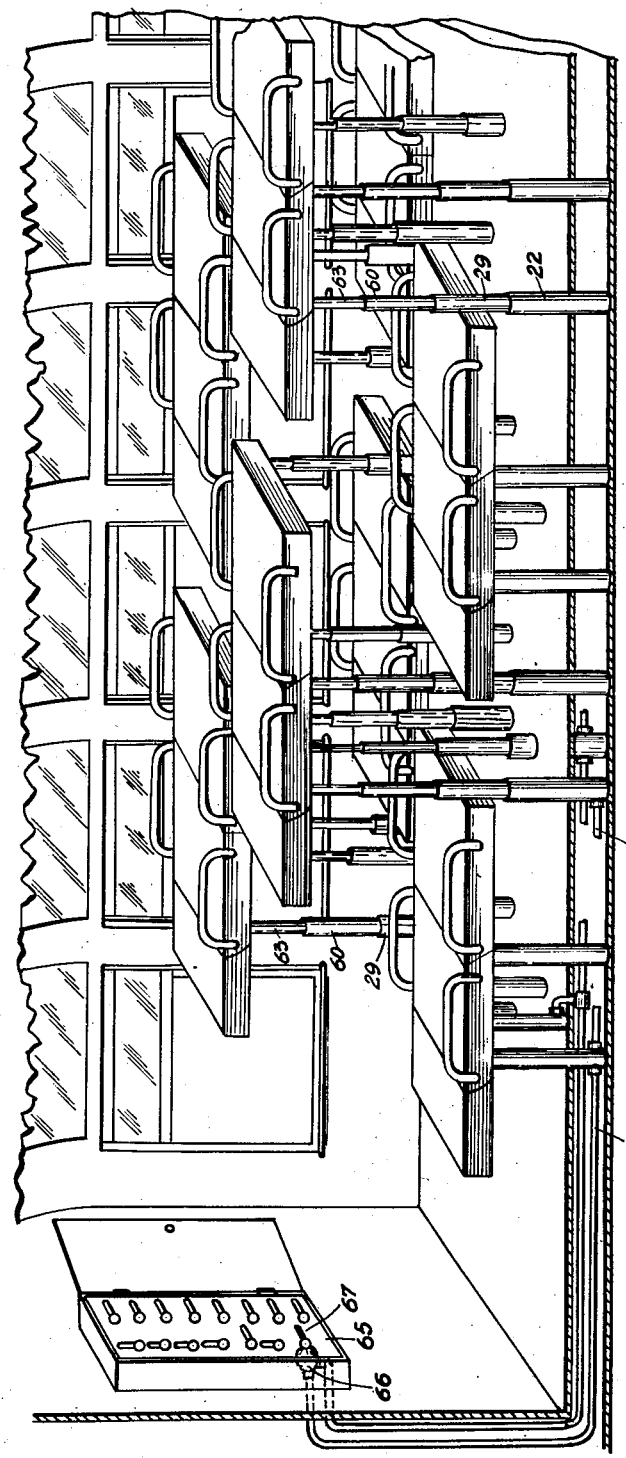
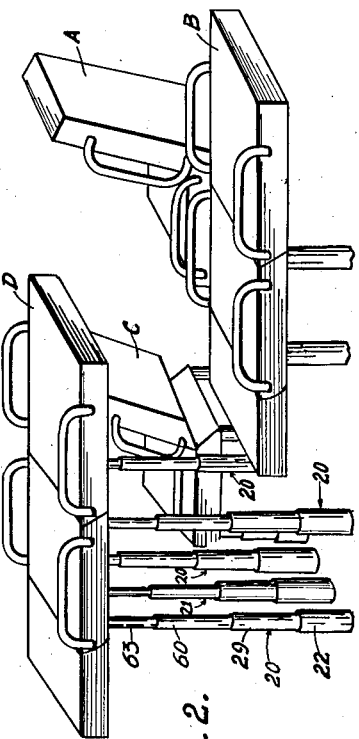
INVENTOR
MAURICE ROSIN
BY
ATTORNEYS Aug. 17, 1943.  M. ROSIN  2,326,972
COMBINED DAY AND NIGHT COACH
Filed Nov. 5, 1940  5 Sheets-Sheet 2
FIG. 3.
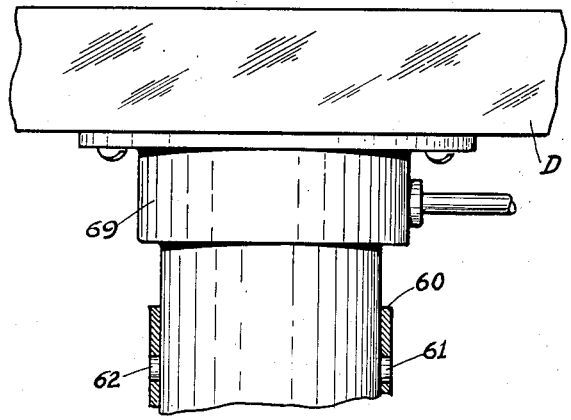
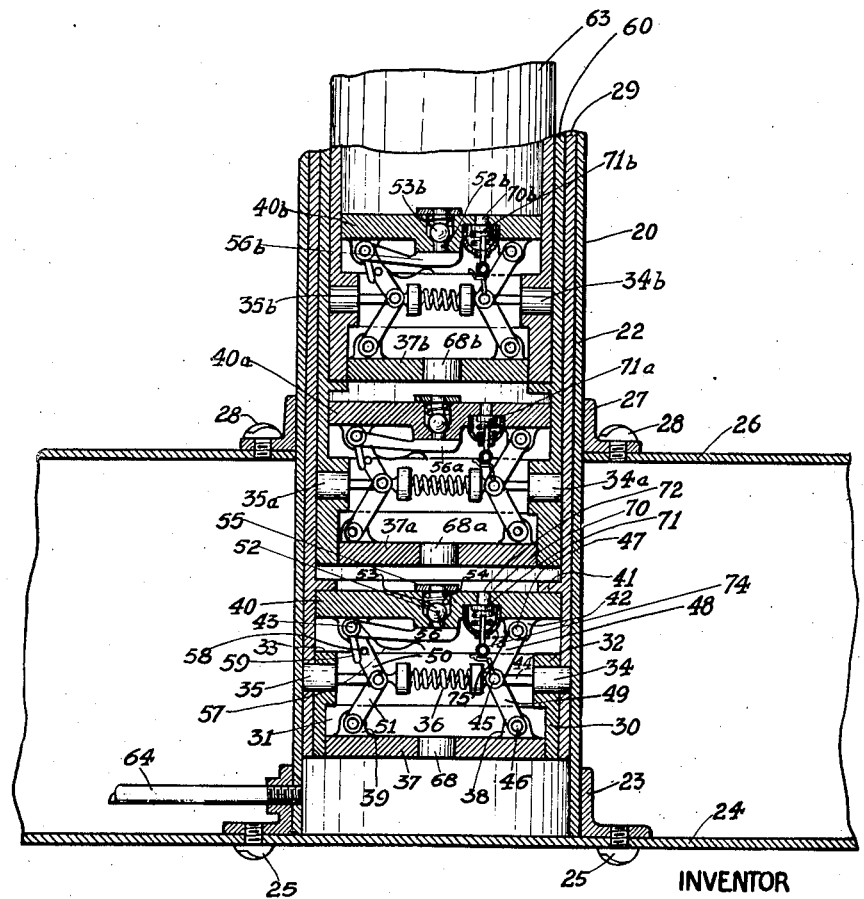
INVENTOR
MAURICE ROSIN
BY Van Deventer + Grier
ATTORNEYS Aug. 17, 1943.   M. ROSIN   2,326,972
COMBINED DAY AND NIGHT COACH
Filed Nov. 5, 1940   5 Sheets-Sheet 3

INVENTOR
MAURICE ROSIN
BY
*Van Deventer & Grier*
ATTORNEYS

Aug. 17, 1943.　　　M. ROSIN　　　2,326,972
COMBINED DAY AND NIGHT COACH
Filed Nov. 5, 1940　　　5 Sheets-Sheet 4

INVENTOR
MAURICE ROSIN
BY
Van Deventer + Grier
ATTORNEYS

Aug. 17, 1943.  M. ROSIN  2,326,972
COMBINED DAY AND NIGHT COACH
Filed Nov. 5, 1940  5 Sheets-Sheet 5
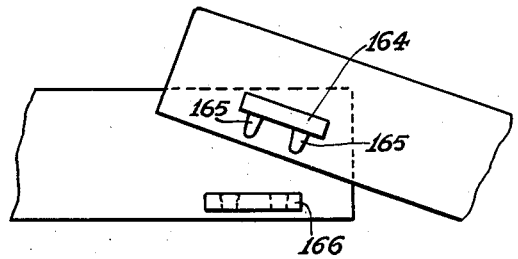
FIG.10.
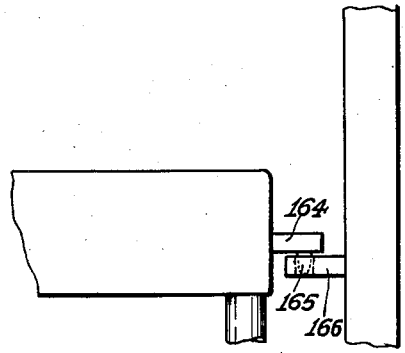
FIG.11.
FIG.9.
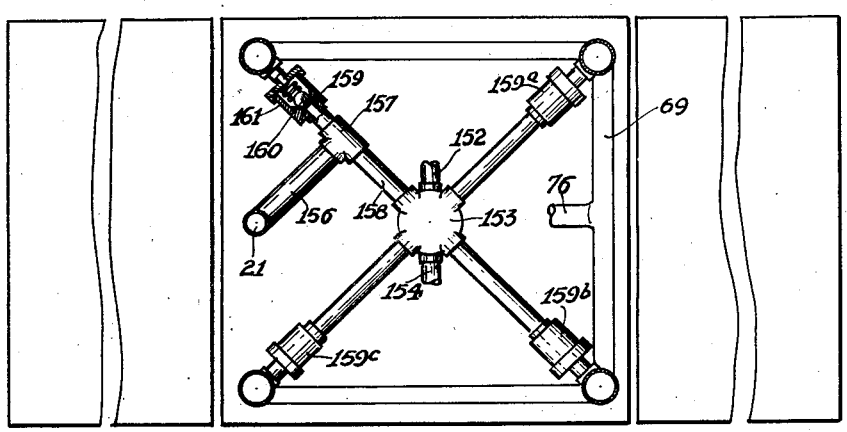
INVENTOR
MAURICE ROSIN
BY
ATTORNEYS Patented Aug. 17, 1943

2,326,972

UNITED STATES PATENT OFFICE 2,326,972

COMBINED DAY AND NIGHT COACH

Maurice Rosin, Albany, N. Y.

Application November 5, 1940, Serial No. 364,370

9 Claims. (Cl. 155—6)

This invention relates to improvements in combined day and night coaches, and has for an object the provision of a coach or cabin including individual passenger seats adapted to be automatically or manually laid out flat whereby the passenger may recline thereon in comfort at night.

Another object of the invention is the provision in the coach or cabin of a plurality of pairs of individual seats and means for automatically flattening out all of said seats and automatically raising one of each pair to provide a staggered arrangement of reclining and/or flat berths.

A further object of the invention is the provision of a seat carried on expansible supports and including mechanism for positioning all of the elements of said seat in a horizontal plane, said expansible supports being adapted to be connected to a source of compressed air for raising the level of said seat.

A further object of the invention is the provision in a coach or cabin of a plurality of individual seats or chairs, alternate ones of which are adapted to be raised, and all of said chairs being adapted to be positioned in a horizontal plane, compressed air controlled mechanism associated with said seats or chairs for raising and/or positioning the elements thereof in a horizontal plane, and control means between a source of compressed air and said mechanism for raising and/or positioning said seats or chairs in a horizontal plane in small groups, thereby enabling the passengers occupying said small group of chairs or seats to stand in the aisle for the few minutes required for the conversion of their seats into berths.

Yet another object of the invention is the provision in a coach or the like of a plurality of individual passenger seats, alternate ones of which are adapted to be positioned in a horizontal plane while those therebetween are adapted to be positioned in a horizontal plane and elevated, the arrangement being such that every seat positioned in the horizontal plane, whether raised or not, has access to the aisle.

Another object of the invention is the provision of passenger seats in a coach or the like, said seats including means for positioning their elements in horizontal planes whereby the passengers may recline thereon at night, and control means for delivering compressed air to said mechanism for effecting the change over from day to night conditions, or the reverse, individually or in groups.

Other objects of the invention will be apparent to those skilled in the art.

Referring to the drawings:

Figure 1 is a perspective view of a portion of a coach showing the seats converted into reclining berths, the same being in staggered relation;

Figure 2 is a view of two pairs of seats, one seat of one of the pairs having its elements horizontally disposed and elevated, and another seat of the other of the pairs horizontally disposed and remaining at its original elevation;

Figure 3 is a sectional elevation of one of the expansible and collapsible tube supports of the seats to be elevated showing details of the air controlled expanding and releasing mechanisms;

Figure 9 is a bottom view of one of the seats shown in its extended position and showing details of the connections to the upper ends of the tubes or columns;

Figure 10 is a fragmentary view showing a portion of the back of one of the seats carrying an engaging member, and a portion of the car wall carrying a cooperating member to be engaged by said engaging member; and Figure 11 is a view of the engaging member shown in Figure 10 in which the engaging members are shown in engagement with each other in a plane at right angles to that shown in Figure 10.

Figure 4:
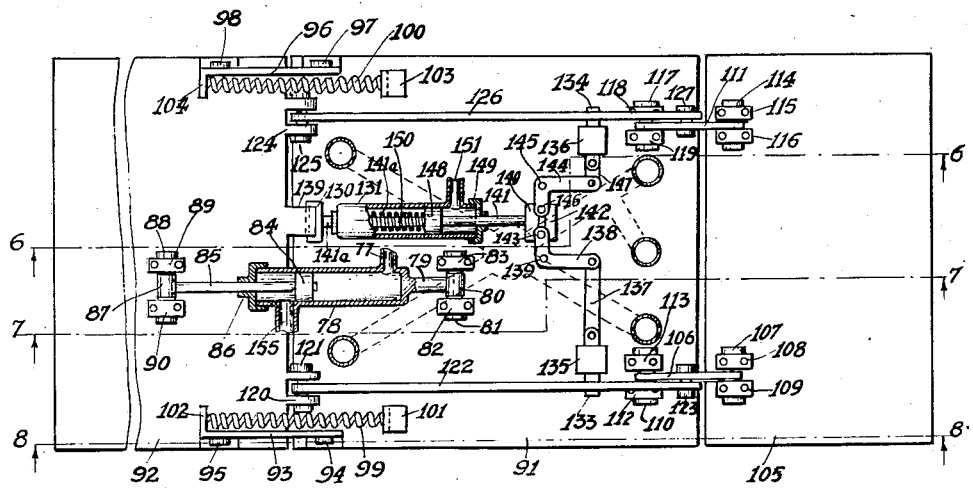
Figure 4 is a bottom view partly in section of the mechanism for locking the seat elements in horizontally disposed positions, the shapes of the seat elements embracing said mechanism being indicated by rectangle lines.
Figure 5:
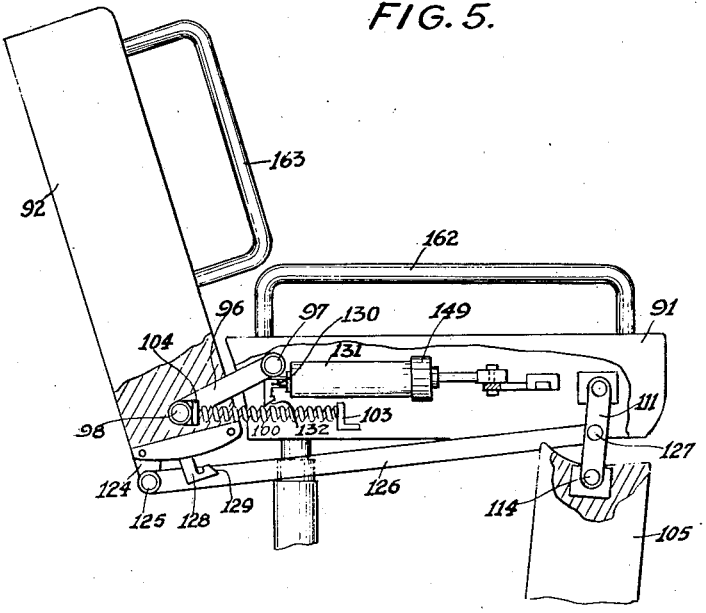
Figure 5 is an elevation partly in section of the seat indicated in Figure 4 as viewed along the lines 6—6 except that the back is in its normal upright position.

Referring first to Figure 2, seats A and B comprise a pair of individual side-by-side seats, and likewise seats C and D comprise an individual pair of side-by-side seats which are used in the usual manner by the passengers for daytime travel. In order to afford a greater degree of comfort to the passengers in a coach or the like, I propose to dispose all of the seats in horizontal planes and elevate every other one in staggered relation; for example seat A would be horizontally disposed and elevated and seat B would be horizontally disposed and allowed to remain at its original seat level. The seats in front of the seats A and B, namely, the seats C and D respectively, are disposed horizontally and the seat C would remain at its normal seat level while the seat D would be elevated. It will be noted that a portion of the seat D overhangs a portion of the seat B when the seats are arranged in this manner. Therefore, by elevating every other one in staggered relation, the seats need not be spaced further apart than standard spacing now employed in existing coaches or the like. Therefore the coaches now in use may be equipped with new and improved convertible seats as well as later models of coaches.

Each seat is provided with mechanism for automatically lowering the back thereof and swinging the footpiece in line with the seat. This automatic mechanism utilizes compressed air which is usually available in all coaches or the like. Simultaneously with the movement of the back and footpieces as aforesaid, every alternate chair is raised to bring its plane on a higher level than that of its neighbor. All seats may preferably be constructed of aluminum alloy or similar light weight material in order to keep all parts at a minimum of weight with a conservative factor of safety, and at the same time to effect economical use of the compressed air.

The seats which are raised are to be heightened to about four and one-half to five feet above the floor of the coach, thereby improving the stability of the structure and at the same time giving the passengers a feeling of security, and the passengers may easily get into them. This also has an advantage in that the center of gravity of the car is kept low. In order to further facilitate matters, short light ladders may be provided for the passengers to get into the elevated seats. These ladders may nest into each other and be kept in a small closet or compartment at the end of the car when not in use.

The seats such as B and C, due to the fact that they are not raised from their normal level, are supported by plain columns which may be in the form of tubes, at least some one of which may lead air to the mechanism for flattening out the seat, and another of which may lead air for releasing the locking mechanism holding the seat parts at a horizontal plane and motivating them to their normal positions.

On the other hand, the columns supporting seats such as A and D are expansibly-collapsible so that the seat thereon may be raised to a higher level and then flattened out. In the reverse order, the seat may be lowered and restored to its normal position. Each seat of the type A or D is supported on four expansible-collapsible columns, each section being extendible by compressed air to a pre-determined position and locked.

A fifth column also expansible-collapsible is associated with each seat and serves to deliver air to the tops of the other four columns for restoring the seat to its normal position as will hereinafter be described.

Referring to Figure 2, the expansible-collapsible columns supporting the seat D are generally designated by the numeral 20, and the fifth column is generally designated by the numeral 21.

The details of the expansible-collapsible columns 20 are shown in Figure 3. Referring to that figure, it will be noted that the outer or lowermost section carries on its lower end in sealed relation thereto a flanged ring 23 which is secured to the sub-floor 24 in fluid-tight relation by any suitable means such, for example, as the screws 25, a suitable gasket or other sealing means (not shown) being positioned between the flanged ring 23 and the floor. The section 22 passes upwardly through a hole in the floor 26, and a suitable flange ring 27 embraces the section and is secured to the floor 26 by means of screws 28. The upper end of the section 22 is provided with holes to be engaged by the locking means; these holes and the locking means will presently be described.

A second section 29 forms a working fit in the section 22. Within the bottom end of the section 29 is mounted in sealed relation thereto, an annular member 30 having its lower end provided with a counter-bored portion 31. The member 30 also carries bosses 32 and 33, and holes extend through these bosses and through the walls of the section 29 and form working fits for locking plungers 34 and 35, respectively. Normally the plungers 34 and 35 rest against the interior wall of the section 22 and are urged outwardly by spring means 36 so that when the section 29 moves upwardly, as will presently be described, to a point where the plungers encounter matching holes in the wall of the section 22, the plungers enter said holes, as will presently be described, and lock the sections in extended order.

A metallic disc 37 is reciprocally mounted in the counter-bored portion 31 and carries on its upper surface bosses 38 and 39.

A metallic disc 40 forms a working fit within the bore of the section 29 and moves as a piston therein along a path, the upper limit of which is defined by an annular stop 41. The piston 40 carries on its lower surface bosses 42 and 43.

The plunger 34 has a shank portion 44 which carries a stud 45, and suitable pivot pins 46 and 47 are mounted respectively in the bosses 38 and 42. A link member 48 has one end pivotally connected to the pin 47, and the other end pivotally connected to the stud 45. Likewise, a link 49 has one end pivotally connected to the pin 46, and the other end pivotally connected to the stud 45. Similar pivot pins and link members are associated with the bosses 39 and 43 and a stud carried by the plunger 35; but since this arrangement is identical with the arrangement just described it need not be here described in detail. However, the corresponding link members respectively are designated by the numerals 50 and 51.

The piston 40 has a central hole formed therein. This hole is designated by the numeral 52 and is stepped to form a valve seat therein, a suitable ball valve 53 seating therein is urged toward the seat by means of a spring 54 which is retained in position by a retainer 55.

Pivotally mounted in the boss 43 is a flapper valve 56 which covers the lower end of the hole 52 and is maintained in seated relation thereon by means of a spring. When pressure enters the lower end of the section 29, this pressure also tends to keep the valve 56 closed until the section moves up to the point where the plungers 34 and 35 encounter holes in the outer section 22 and move outwardly. When this occurs, a stud 58 carried on the link member 50 engages a crank arm 59 secured to the valve 56 and thereby swings the valve 56 downwardly off its seat. This permits the compressed air to pass into the opening 52 and to thereby raise the ball valve 53 off of its seat, whereupon said air may pass into the third section 60. The lower end of the third section is provided with the same kind of pistons, plungers, linkages, and valves just described; some of these parts being designated by the same numerals as those of the parts above described, with the addition of the letter "a." For example, the piston mounted in the bottom of the third section 60 is designated by the numeral 40ª, and the plungers 34 and 35 are designated by the numerals 34ª and 35ª.

The upper end of the column 60 is shown in Figure 3 and is provided with lateral holes 61 and 62 which are engaged by the plungers 34ᵇ and 35ᵇ respectively, when the fourth section 63 is extended.

Compressed air is delivered to the bottom of the first section 22 via a pipe 64, which pipe may extend to a control panel 65 (see Figure 1) on the wall of the coach. A suitable valve 66 is provided with a handle 67 making it convenient for the porter or other attendant to condition the seats for night use from a given position in the coach. The valves, such as the valve 66, may be connected to control the seats individually, or it may preferably be connected to control a group of seats within a given section in the coach.

Referring again to Figure 3, the compressed air enters the lower end of the section 22 via the pipe 64 and passes through the opening 68 formed in the disc 37, and thereby acts upon the piston 40. This action propels the second section 29 upwardly until the plungers 34 and 35 engage aligned holes in the upper portion of the section 22, such holes being arranged similar to those shown for 61 and 62.

When the plungers snap into these holes, the stud 58 engages the lever 59 and opens the valve 56, thereby permitting air to pass via the hole 52 and the valve 53 into the bottom of the next section 60. The piston 40ª in this section is acted upon in the same manner as described in connection with piston 40, raising the section 60 to a point where its plungers 34ª and 35ª engage holes near the upper end of the section 29. This kicks open the valve 56ª and permits air to pass into the lower end of the section 63 causing this section to rise to a point where its plungers 34ᵇ and 35ᵇ engage the holes 61 and 62. This causes the valve 56ᵇ to kick open and the compressed air may then pass via the valve 56ᵇ into the manifold at the top of the column end to which the seat D is secured. The compressed air is then utilized to "flatten out" the seat in a manner to presently be described.

The metallic disc 40 has an opening 70 formed therein, and a valve member 71 normally holds this valve closed. A suitable support 72 for the valve forms a cage in which is mounted a spring 73 which urges the valve toward its seat, covering the hole 70. The stem of the valve carries a roller 74 which is engaged by an arm 75 carried on the shank 44. As soon as the plungers 34 and 35 move outwardly to engage holes in the wall of the tube 20, such as the holes 61 and 62 shown in the tube 60, the arm 75 engages the roller 74 and prevents the valve 71 from unseating even when pressure is applied therethrough to the hole 70. Likewise the discs 40ª, 40ᵇ, etc., are provided with identical valves which are locked in closed positions when the respective plungers 34, 35, associated therewith engage holes such as those shown in 61 and 62.

When it is desired to restore the seat to its normal position, compressed air is delivered via the fifth column, hereinbefore referred to, to the manifold 69. When this compressed air enters the top sections of the four columns supporting a seat, the compressed air acts upon the uppermost disc 40, and since the air cannot pass through the hole 52ᵇ due to the fact that it is closed by the ball 53ᵇ, and likewise due to the fact that the air cannot pass through the hole 70ᵇ as it is closed by a locked valve, the disc is moved downwardly like a piston, thereby withdrawing the plungers 34ᵇ and 35ᵇ from the holes 61 and 62 with which they were respectively engaged. This action releases the valve 71ᵇ and permits air to pass through the hole 70ᵇ into the space between the disc 40ᵇ and the disc 37ᵇ, and thence via the hole 68ᵇ and on to the disc 40ª where the operation is repeated, withdrawing the plungers 34ª and 35ª, releasing the valve 71ª, and permitting the air to pass into the space between the disc 40ª and the disc 37ª and thence via the hole 68ª to act against the disc 40. The disc 40 under the urge of the air withdraws the plungers 34 and 35 from the holes in the column 20 with which they are engaged.

The above sequence of events occurs rapidly with the result that the tubular column collapses and the seat supported thereby is again lowered to its normal level.

In extending the columns, the operation of which was hereinbefore described, the air, as was stated, passes into the manifold 69. This is due to the fact that the flapper valve 56ᵇ, by the action of the plungers 34ᵇ and 35ᵇ in engaging the holes 61 and 62, uncovers the hole 52ᵇ and permits the air to pass via the ball valve 53ᵇ into said manifold. This air is utilized to "flatten down" the seats in a manner now to be described.

Referring to Figure 9, which is a bottom view of one of the seats, showing the manifold 69, a nipple 76 is connected by means of a flexible connector or hose (not shown), to the nipple 77 extending from the cylinder 78 (in the bottom of the seat, lying in a different plane from that shown in Figure 9). This level may be seen in Figure 4. The cylinder 78 has a shank 79 extending therefrom which carries on the end thereof a boss 80, which is journaled on the stud 81, supported by bearings 82 and 83 on the bottom 91 of the seat, as shown.

A piston 84 is reciprocably mounted in the cylinder 78 and has a piston rod 85 extending through a suitable stuffing box 86 carried on the end of the cylinder 78. The piston rod 85 terminates in a boss 87 which has a cross hole formed therein and journaled on the stub shaft 88. The stub shaft 88 is suitably supported on the back 92 of the seat by means of bearings 89 and 90.

A bar 93 has one end pivotally connected to the bottom 91 of the seat by a shouldered screw 94, and the other end pivotally connected to the back 92 by means of a shouldered screw 95 on one side of the seat. A second bar 96 has one end pivotally connected to the bottom of the seat by means of a shouldered screw 97, and the other end pivotally connected to the back 92 by means of a shouldered screw 98 on the other side thereof. These two bars hingedly connect the bottom 91 and the back 92 of the seat together.

Springs 99 and 100 normally tend to urge the back of the seat to its normal or upright position. One end of the spring 99 is connected to a bracket 101 on the bottom 91; and the other end is connected to a bracket 102 mounted on the back 92 of the seat. Likewise, the spring 100 has one end secured to a bracket 103, and the other end to a bracket 104.

A link 106 has a hole in one end thereof journaled on a stub shaft 107, which is supported by bearings 108 and 109 on the seat foot-piece 105. The other end of the link 106 has a cross hole therein journaled on the stud shaft 110 which is supported on the seat bottom 91 by means of bearings 112 and 113. A second link 111 has one end journaled on a stub shaft 114, supported by bearings 115 and 116 on the foot-piece 105; and the other end journaled on a stub shaft 117, supported by bearings 118 and 119 on the seat bottom 91. The links 106 and 111 form hinge connections between the bottom and the foot-piece.

A U-shaped bracket 120, carried on the lower end of the back 92, carries a stub shaft 121 upon which one end of a bar 122 is journaled. The other end of the bar 122 is pivotally connected to the midpoint of the link 106 by means of a stud 123. A U-shaped bracket 124 also carried on the lower end of the back 92, carries a stub shaft 125, upon which one end of a bar 126 is journaled. The other end of the bar 126 is pivotally connected to the midpoint of the link 111 by means of a stud 127.

A hook-shaped member 128 is mounted on the bottom end of the back 92 and has a portion 129 thereof forming a cam surface. A second hook-shaped member 130 supported on a piston rod extension 141ª mounted in a cylinder 131, is carried within the bottom 91 of the seat. The member 130 is also provided with a cam surface 132.

Now, as to the operation for flattening the seat, bringing the back 92 and the bottom 91 and the foot-piece 105 into alignment with each other along a horizontal plane, air from the manifold 69 passes from the nipple 76 via the flexible connector (not shown) and the nipple 77 into the cylinder 78 and acts upon the piston 84 and moves the same toward the left, as viewed in Figure 4. This tends to increase the distance between the stub shaft 81 and the stub shaft 88, and thereby causes the back 92 to move downwardly toward the horizontal plane.

Now due to the linkages between the bars 122 and 126 and the link members 106 and 111, respectively, the foot-piece 105 is at the same time raised toward the horizontal plane. As the piston 84 continues to move to the left, as viewed in Figure 4, the hook-shaped member 128 and the hook-shaped member 130 engage each other. First the camming surfaces 129 and 132 contact each other and further motion effects the engagement of the hook-shaped portions of the members 128 and 130 with each other, thereby locking the seat back 92 and the foot-piece 105 in alignment with the seat bottom 91, making the seat into a device upon which the passenger may recline.

Figure 6:
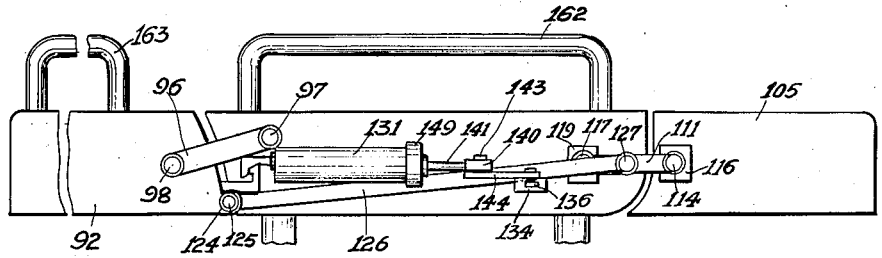
Figure 6 is a sectional elevation taken along the lines 6—6 of Figure 4.
Figure 7:
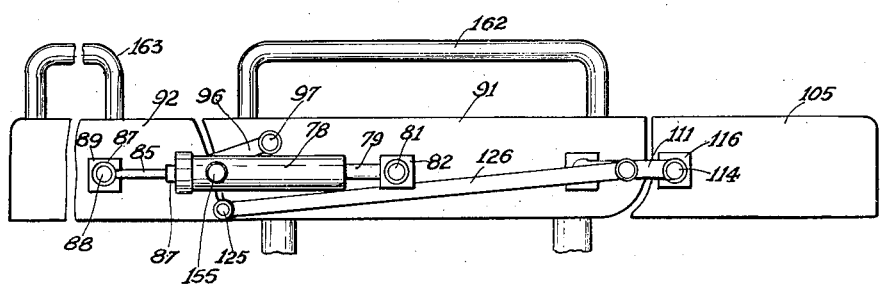
Figure 7 is a sectional elevation taken along the lines 7—7 of Figure 4.
Figure 8:
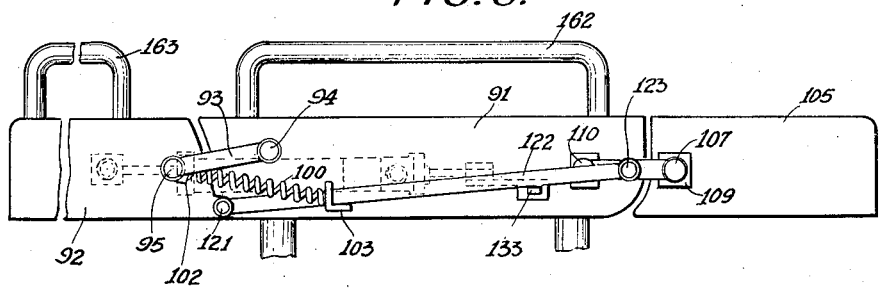
Figure 8 is a sectional elevation taken along the lines 8—8 of Figure 4.

The positions of the parts, when the seat is horizontally disposed as just described, may be seen in Figures 6, 7, and 8.

In addition to the locking effect of the hook-shaped members 128 and 130, bolts 133 and 134, slidably mounted in blocks 135 and 136 respectively, are provided for engaging the bars 122 and 126. This locking effect may be seen in Figure 8, wherein the bolt 133 snaps out beneath the bar 122, making it impossible for the bar 122 to move downwardly until released (see Figures 4 and 8).

The bolt 133 is pivotally connected to a link 137, which is in turn pivotally connected to a bell crank 138. The bell crank 138 is pivotally mounted on the frame of the seat bottom 91 by means of a pivot shaft 139.

A block 140, carried on the piston rod 141, has a cross slot 142 formed therein in which a stud 143 carried by the bell crank 138 operates. A second bell crank 144 pivoted to the frame at 145 carries a stud 146 which also engages the slot 142. The other arm of the bell crank is linked to the bolt 134 by means of the link member 147.

The cylinder 131 carries a piston 148 which is connected to both the piston rod 141 and the piston rod extension 141ª. The end of the cylinder is capped with a suitable stuffing box 149, and a spring 150 within the cylinder 131 tends to urge the piston toward the right end, as viewed in Figure 4. A nipple 151 communicates with the interior of the cylinder and is flexibly connected (not shown) to a nipple 152 communicating with the manifold 153, so that when air is supplied to the manifold 153, as will presently be described, air may enter the cylinder 131 via the nipple 151 and act against the piston 148, moving it to the left, as viewed in Figure 4, and thereby withdrawing the bolts 133 and 134 from beneath the bars 122 and 126 and at the same time disengaging the hook-shaped member 130 from the hook-shaped member 128.

At the same time air from the manifold 153 passing via the nipple 155 on the cylinder 78 acts against the piston 84 and moves it to the right, as viewed in Figure 4, thereby shortening the distance between the shafts 81 and 83 and causing the back 92 to swing upwardly and the foot-piece 105 to swing downwardly, and bring the seat to its normal upright position. This action is abetted by the springs 99 and 100. It must be remembered at the same time this occurs, some of the air causes the extended columns supporting the seat to collapse and bring the seat down to its normal sitting level.

Referring now to Figures 2 and 9, the fifth column, designated by the numeral 21, consists of a series of extensible pipes which are connected to a source of air when it is desired to restore the seat to its normal level and position. The upper end of the fifth column 21 connects to the manifold 153 by means of a pipe 156, a T 157 and a nipple 158. The T also connects to a valve body 159 which is in turn connected to the manifold 69. A ball valve 160 is seated in the valve body by means of a spring 161, and this valve prevents air from the manifold 69 from entering the manifold 153 and permits air from the manifold 153 to enter the manifold 69. Other valves 159ª, 159ᵇ and 159ᶜ, which are identical with the valve 159, are included in circuits between the manifold 153 and the manifold 69.

It must be remembered that air after it has extended the columns 29, may enter the manifold 69 and thence pass into the cylinder 78 via the nipple 77 for bringing the parts of the seat into a horizontal plane. This air is prevented from entering the manifold 153 by the series of valves 159 to 159ᶜ inclusive.

The air for restoring the seat to its normal level and upright position is all supplied to the manifold 153 via the fifth column 21. Part of the air passes via the nipple 152 to the cylinder 131 via the nipple 151 and part of it passes to the cylinder 78 via the nipple 155. In addition to this, air also passes via the valves 159 to 159ᶜ, inclusive, and functions to release the locking plunger, as hereinbefore described.

The seat bottoms may be provided with suitable end extensions 162, and the backs may be provided with similar extensions 163 to further insure the passenger's comfort.

The extended seats near the wall of the car may carry brackets such as the bracket 164, with downwardly projecting tapered studs 165 which may engage corresponding tapered holes formed in a matching member 166 secured to the wall of the coach.

On those seats which are not elevated, one of the four supporting columns may serve as an air pipe for delivering air to the manifold 69, which air would thence be delivered to the cylinder 78 via the nipple 77 for flattening down the seat without raising it, and one of the other columns may function to deliver resetting air to the manifold 153, which air in turn would be delivered to the cylinder 131 via the nipple 151 and to the other end of the cylinder 78 via the nipple 155. The resetting operation is just the same for the seats which are not raised as has been hereinbefore described for the seats that have been raised.

It must be understood that the embodiment of the invention herein described is given by way of example and that many changes may be made in the arrangement shown and described without departing from the spirit of the invention as set forth in the following claims.

What is claimed is:

1. In a coach for passengers, in combination, a seat having a horizontal portion, a substantially vertical portion hingedly linked thereto and forming a back therefor, means for swinging said back from a substantially vertical plane to a substantially horizontal plane in line with said horizontal portion so that a passenger may recline on both said portions, locking means for retaining said back in said substantially horizontal position, remote control means in said coach for controlling said means for swinging said back, other remote control means for effecting the unlocking of said locking means, and means for urging said back to swing to its normal vertical position after said locking means is unlocked.

2. The invention according to claim 1 in which the horizontal portion and said back have linked thereto a substantially vertical foot piece portion which also swings to a substantially horizontal plane in time with the movement of said back to the horizontal plane, whereby a passenger may recline on all three of said portions, said locking means being adapted to retain both said back and said foot piece portion in said horizontal plane until unlocked, and in which said means for urging also urges said foot piece portion to return to its vertical position after said locking means is unlocked.

3. In a coach for passengers, in combination, a seat having a horizontal portion, a substantially vertical portion linked thereto and adapted to be swung to a substantially horizontal position in line with said horizontal portion, pneumatically controlled mechanism for swinging said back to said horizontal position, locking means for locking said back in said last mentioned position, pneumatically actuated means for unlocking said locking means, and control means within said coach remote from said seat for selectively effecting the delivery of compressed air to said pneumatically controlled mechanism or to said pneumatically actuated means.

4. The invention according to claim 3 in which the horizontal portion and said back have linked thereto a substantially vertical foot piece portion which is also adapted to swing to a substantially horizontal plane in time with the movement of said back to the horizontal plane, and in which said locking means also retains said foot piece portion in said horizontal plane until unlocked.

5. In a coach for passengers, in combination, a seat having a horizontal portion and a substantially vertical portion hingedly linked thereto and forming a back therefor, pneumatically controlled mechanism for swinging said back to a substantially horizontal position in line with said horizontal portion, a plurality of telescopic columns supporting said horizontal portion a normal height above the floor of said coach, means for supplying compressed air to said columns for causing them to extend and raise said seat to a level higher than said normal height, and means communicating with the upper ends of said columns operative to deliver said compressed air to said pneumatically controlled mechanism after said seat has been raised to said higher level for swinging said back to said horizontal position.

6. In a coach for passengers, in combination, a seat having a horizontal portion and a substantially vertical portion hingedly linked thereto and forming a back therefor, pneumatically controlled mechanism for swinging said back to a substantially horizontal position in line with said horizontal portion, locking means for retaining said back in said horizontal position, a plurality of telescopic columns supporting said horizontal portion a normal height above the floor of said coach, each of said columns consisting of a series of nested tubular sections adapted to be extended and including means to lock said sections in extended order when extended a predetermined distance, means for supplying compressed air to said columns for causing them to extend and raise said seat to a level higher than its normal level, means communicating with the upper ends of said columns operative to deliver said compressed air to said pneumatically controlled mechanism after said seat has been raised to said higher level for swinging said back to said horizontal position, and pneumatically controlled means for unlocking the sections of said columns and unlocking said locking means for permitting said seat to return to its normal height above the floor and for permitting said back to assume its normal substantially vertical position.

7. In a coach for passengers, in combination, a seat having a horizontal portion, a substantially vertical portion hingedly linked to one edge thereof and forming a back therefor, a foot-piece projecting substantially downwardly and hingedly linked to an opposite edge thereof, linkages between said back and said foot-piece to cause them to move in unison, locking means for retaining said back in said substantially horizontal position, a second locking means for locking said foot-piece in a substantially horizontal position when the latter is moved to such position in unison with the movement of said back, other linkages including a cylinder and a piston between said horizontal portion and said back, said cylinder having a first inlet for admitting air to cause said back and foot-piece to swing to said horizontal positions and having a second inlet for actuating said piston to cause said back and foot-piece to swing to their normal substantially vertical positions, a second cylinder also having a piston therein linked to both said locking means for conjointly releasing both said devices when compressed air is delivered to said second cylinder whereby when compressed air is delivered to said second inlet of said first cylinder, said back and foot-piece are returned to their normal substantially vertical positions.

8. The invention according to claim 7 in which said seat is supported on a plurality of telescopic columns, each of said columns comprised of a plurality of tubular sections including piston means and locking plungers whereby when compressed air is delivered to the bottom of the outer sections of said columns, said columns are extended to a predetermined length thereby raising said seat, said plungers serving to lock said sections in extended relation to maintain said seat at said height, valves in said piston means permitting compressed air to pass therethrough as each of said sections is extended, connections between the top or inner sections and said first inlet of said first cylinder whereby said back and said foot piece may be swung to said substantially horizontal positions, and other connections including one-way valves between said inner or upper sections and a control for delivering reset compressed air, said last connections also including other connections to the inlet of said second cylinder and said second inlet of said first cylinder for withdrawing said plungers permitting said seat to settle down to its normal level and also for releasing said locking means and swinging said back and foot piece to their normal substantially vertical positions.

9. In a passenger coach seat which includes a horizontal portion, a substantially vertical back portion hingedly linked thereto and a substantially vertical foot-piece portion, a support for said seat including, a vertical tubular member having its lower end fluid tight and adapted to be connected to a source of compressed air, an engageable opening in the wall of said member and spaced apart from said lower end, a second tubular member slidably mounted within and in fluid tight relation to said first tubular member, means in the lower end of said second tubular member forming in effect a piston head, a spring loaded plunger carried by said head and adapted to engage said opening, a valve in said head, means associated with said plunger normally blocking said valve and adapted to free said valve when said plunger engages said opening, whereby compressed air after raising said second tubular member to the position where said plunger engages said opening may pass through said head via said valve, linkages between said back and said foot-piece portion to cause said back and said foot-piece portion to move in unison with each other, a cylinder supported by said seat and including a piston, other linkages between said piston and said first linkages whereby said back and said foot-piece may be caused to swing horizontally in line with said horizontal portion, and connections between said valve and said cylinder for permitting compressed air to pass through said head and via said valve to said cylinder after said tubular member is extended by said air.

MAURICE ROSIN.